Jan. 12, 1971  P. J. DENNIS  3,555,478
CIRCUIT BREAKER
Filed April 25, 1968
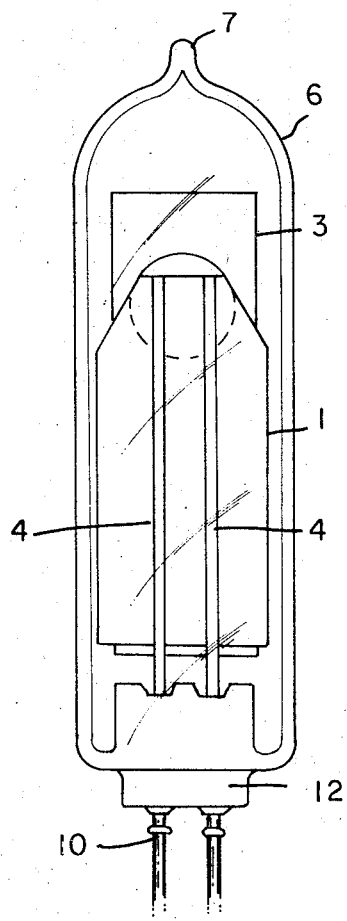
FIG. I
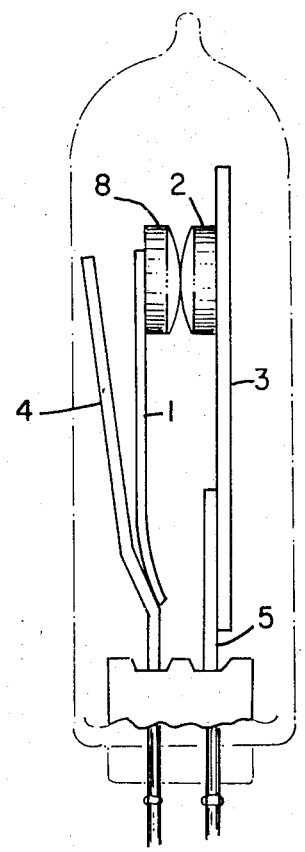
FIG. 2
INVENTOR
PHILIP J. DENNIS
BY
ATTORNEY

United States Patent Office 3,555,478
Patented Jan. 12, 1971

3,555,478
CIRCUIT BREAKER
Philip J. Dennis, Lynn, Mass., assignor to Sylvania Electric Products Inc., a corporation of Delaware
Filed Apr. 25, 1968, Ser. No. 724,211
Int. Cl. H01h 37/04, 37/52, 61/013
U.S. Cl. 337—89                        9 Claims

ABSTRACT OF THE DISCLOSURE

A glass enclosed control device comprising a contact plate and a metallic snap-action element capable of opening an electrical circuit upon thermal or current overload. The snap element is fastened to a pair of lead-in wires which limit the gap distance between the snap element and the contact plate, when the element snaps open.

BACKGROUND OF THE INVENTION

Field of the invention

This invention pertains to protective devices for non-permanent interruption of an electrical circuit when the control element of the device attains a predetermined temperature, resulting either from current overload or thermal rise. More particularly, it relates to such devices which are used with electrical equipment in which overheating can be destructive to such equipment. Examples of such equipment are electric motors, water heaters and fluorescent ballasts.

DESCRIPTION OF THE PRIOR ART

Circuit breakers are commonly used in different environments. For example, when used in motors, they may be attached to stationary field coils to protect the motor from thermal or current overload. In such applications the circuit breaker is subjected to, inter alia, an expanding and collapsing magnetic field resulting from the inductive motor coils.

They are also used in refrigeration systems and may be installed in the high pressure line of a compressor, where they can be subjected to pressures above 1000 pounds per square inch. Such breakers must be hermetically sealed to prevent any contact between the refrigerant and the internal elements of the breaker since such contact might impair the reliability of the breaker. It is also desirable to subject the refrigerant to the arcs that occur when the breaker opens.

Such devices have commonly been encapsulated in metal or plastic; however, they have been difficult to hermetically seal and expensive to manufacture. In addition, metal encapsulated devices usually required an insulating covering and furthermore had excessive mass which resulted in an undesirable thermal lag. With encapsulated devices, another problem was excessive arcing, especially when the device was situated in a magnetic field. When the breaker contacts opened, the magnetic field could cause excessive arcing, not only between the breaker contacts but also between one contact and other elements of the circuit breaker. Such arcing could seriously damage the device and eventually render it inoperative.

SUMMARY OF THE INVENTION

An electrical control device in accordance with this invention comprises a thermostatic snap action metallic element, which opens and interrupts an electrical circuit when the element attains a predetermined temperature. Either excessive current or ambient heat will actuate, or snap, the element. The element will then remain open until it has cooled to a predetermined temperature, usually about 5 to 50° C. below its opening temperature, at which point it will close and permit resumption of current flow.

Under normal operation, that is, when the snap element is closed, it is in electrical junction with a substantially rigid, metallic contact plate. Rigidity is desired in the plate to prevent substantially any movement or displacement thereof during the useful life of the device. Such movement could undesirably alter the calibration or actuating temperature of the circuit breaker.

Preferably, however, the snap element and the plate have suitable, low-resistance metal contacts, such as silver-clad copper contact buttons, affixed thereto at their respective electrical junction points. Such contacts are more resistant to the electrical arcs that occur therebetween and are, therefore, more durable and longer lived.

In order to prevent excessive arcing, especially when the device is situated in an alternating magnetic field, the snap element movement, upon opening, is limited by a mechanical stop behind the element. The stop is positioned in such a manner that it permits the element to snap open at the actuating temperature but limits the gap between the open contacts. That is, the gap should be generally only large enough to prevent a voltage breakdown thereacross due to the normal operating voltage of the device which is, usually, 120 or 240 volts A.C. The reason for the desired proximity of the contacts, at an opened condition, is this: it is possible for a peak voltage greater than that of the operating voltage to be induced across the opening contacts by the environmental magnetic field. This peak voltage would occur at about the same rate as the line frequency, usually 60 cycles, and thus the tendency of the arcing would be to occur at approximately the same intervals as the 60 cycle peaks. However, the arc must be at a minimum temperature of about 3000° K. in order to maintain itself. The effect, then, of having proximate contacts is to cool, and therefore extinguish, the arc to a greater extent than contacts having a greater separation.

Preferably, for simplicity of manufacture and to minimize the number of elements comprising the circuit breaker, a lead-in wire also comprises the mechanical stop. The lead-in wire is shaped and positioned so that its upper end extends into the breaker envelope to about the same distance as the upper or contact end of the snap element. The upper end of the lead-in wire is positioned in the back of the snap element and spaced therefrom the proper distance, as mentioned above, to limit the movement of the contact end of the snap element, upon opening thereof. The lower end of the snap element is fastened, such as by welding, to an intermediate point of the lead-in wire.

Preferably, the lead-in wire is of a type that is suitable for glass-to-metal seals in order to permit the use of a glass envelope. A glass envelope is inexpensive, easily hermetically sealed and capable of withstanding high external pressures. An example of a satisfactory lead-in wire is dumet wire, which has a steel core surrounded by a sheath of copper about one mil thick. The copper sheath seals to the glass satisfactorily and is soft enough to accommodate normal thermal expansion differences between the glass and the metal without the rupture of the seal.

For purposes of reliability, that is, to minimize the possibility of seal cracks either during manufacture or use of the device, the diameter of the lead-in wire should not exceed about 30 mils. Wire of that diameter can reliably handle only about 12 amperes of continuous current. Thus, for devices having a greater current capacity, say, about 15 to 18 amperes, I prefer to use two lead-in wires, in parallel but spaced apart. In that case, both wires can have the same shape and both can serve as the mechanical stop and support for the snap element.

The contact plate, in addition to having sufficiently rigidity to reduce its deflection to a minimum, may serve as either a heater or a heat sink, depending on the desired characteristics of the control device. For example, if it is desired to produce a fast-responding device, that is, one with minimum thermal lag, the plate may be made of a high resistance metal, such as steel. The $I^2R$, or electrical, losses in such a plate generate heat which makes the device respond rapidly to current overloads. Conversely, a plate made of a low resistance metal, such as brass or phosphor bronze, and having relatively large mass, would act as a heat sink and produce a slower responding device. Such flexibility in the design of the contact plate provides a simple means for varying the current rating of particular devices. Furthermore, the size of the plate may be such as to provide additional protection to the glass envelope from arcs that may occur when the snap element opens. Also, the plate may be made of a metal, such as nickel steel, that shields the contact points from magnetic fields. In such a case, of course, the amount of shielding that would be provided would depend on the extent of encompassment of the contacts by the plate.

BRIEF DESCRIPTION OF THE DRAWING

FIG. 1 is a front elevational view of a control device in accordance with this invention.

FIG. 2 is a side elevational view of the same device with the envelope shown in phantom.

DESCRIPTION OF THE PREFERRED EMBODIMENT

In the device shown in FIGS. 1 and 2, envelope 6 is tubular and made of transparent soft glass. Exhaust tube tip-off 7 is located at the upper end thereof and is the sealed remnant of the exhaust tube (not shown) by means of which envelope 6 was exhausted, filled and sealed. The lower end of envelope 6 is sealed to glass wafer 12. Wafer 12 is substantially cylindrical and was premolded around metal lead-in wires 4 and 5 to form hermetic glass-to-metal seals therewith. One portion of the circumference of wafer 12 is raised, that is, it has a larger diameter than the balance of the wafer, in order to correspond to the inside diameter of envelope 6 and to provide for a satisfactory seal therewith.

Lead-in wires 4 and 5, of which there are two each shown in the drawings, extend beyond both ends of wafer 12, that is, they extend into envelope 6 and also extend externally. The internal extensions serve as the connecting supports for snap element 1 and contact plate 3, and the external extensions provide for the external electrical connections.

The upper portions of lead-in wires 4 and 5, starting from a point just below wafer 12, shown in the drawings as joint 10, are made of a metal, such as dumet, having satisfactory sealability to glass and adequate strength and conductivity for their function as lead-in and support wires.

Contact plate 3 is connected, such as by welding, to lead-in wires 5 at or near the upper ends thereof. Plate 3 is usually rectangular and its size, thickness and composition can be varied, according to the requirements of the device, as mentioned before. Contact button 2 is fastened, such as by welding, to plate 3 at or near its upper end and, preferably, centrally positioned thereon. Button 2 is made of an arc resistant metal, such as silver-clad copper, and is massive in relation to the normal widths of arcs that may occur between contact buttons 2 and 8. Additionally the contact surface of button 2 is smooth and convex shaped to eliminate any sharp points or projections as arc sources.

Lead-in wires 4 are bent at a point slightly above wafer 12, and snap element 1 is connected, such as by welding, to lead-in wires 4 near the bend. Element 1 is a snap- acting, laminated, thermostatic metal, such as shown in U.S. Pat. 3,278,705, issued on Oct. 11, 1966, to the instant applicant, and comprises metal laminae having different coefficients of thermal expansion. Element 1 has a dish-shaped portion thereon which causes the snap action of the element when it is heated to a predetermined temperature. Contact button 8, which is similar to button 2, is fastened to the upper end of element 1.

The upper portions of lead-in wires 4 extend upward from the bend in back of, and spaced from, element 1 and terminate near the upper end of element 1. The upper ends of lead-in wires 4 are spaced from element 1 the proper distance to limit the movement of element 1, when it snaps open, in order to maintain the preferred gap between buttons 2 and 8, as mentioned above. It is not necessary that the ends of wires 4 terminate near the end of element 1 since wires 4 could also serve as satisfactory mechanical stops if they extended a sufficient distance which could be short of, or beyond, the end of element 1.

The externally extending portions of lead-in wires 4 and 5 can be of a different composition than the sealed portion for improved conductivity and corrosion resistance, since sealability is not required. In a specific example, the lead-in wires below joint 10 were made of nickel plated copper of the same diameter as the dumet portion. The copper and dumet portions were securely welded end-to-end at joint 10 to give an integral unitary lead-in wire.

In a specific example of a circuit breaker designed to open at a current of 20 amperes or a temperature of 130° C., envelope 6 was 1½ inches long by 0.405 inch diameter. The device had two wires 4 and two wires 5 spaced about 0.095 inch apart at wafer 5. Wires 5 extended about 5/16 inch into the envelope and wires 4 extended about 5/8 inch therein. Element 1 was approximately rectangular, about 0.600 by 0.300 inch, and about 0.006 inch thick. The corners thereof were biased to eliminate right angle corners.

When element 1 was closed, the upper ends of lead-in wires 4 were spaced about 3/32 inch therefrom. Plate 3 was made of nickel plated steel, 0.030 inch thick, and was rectangular, 0.230 by 0.750 inch. Contact buttons 2 and 8 were roughly cylindrical, about 3/16 inch diameter by 1/16 inch thick. The device was filled with air to a pressure of 1000 millimeters of mercury.

Although the circuit breaker was only rated for 20 amperes of continuous current, it operated satisfactorily under severe arcing conditions for over 20,000 cycles at locked rotor current of 60 amperes.

It is apparent that modifications and changes can be made within the spirit and scope of the instant invention, but it is my intention to be limited only by the scope of the appended claims.

What is claimed is:

1. A circuit breaker comprising:
    a hermetically sealed glass envelope having a substantially cylindrical glass wafer sealed at the lower end thereof;
    a first lead-in wire sealed in said wafer and extending internally and externally of said envelope;
    a second lead-in wire extending into said envelope and spaced from said first lead-in wire;
    a thermostatic snap acting metallic element for making and braking electrical contact between said two lead-in wires disposed within said envelope, the lower end of said metallic element being affixed to said first lead-in wire at a point intermediate the upper end thereof and said wafer;
    the upper portion of said first lead-in wire being spaced from the free end of said metallic element to limit the amount of travel of said free end of said element, whereby arcing upon the breaking of electrical contact between said two lead-in wires is reduced and the life of the circuit breaker is prolonged.

2. The device of claim 1 wherein the separation between the upper portion of said first lead-in wire and said element is less than the normal opening distance of said element.

3. The device of claim 2 wherein said second lead-in wire is sealed in said wafer and includes a contact plate disposed in said envelope and affixed to the upper end of said second lead-in wire, said contact plate being in electrical contact with said metallic element when said element is in its normally closed position.

4. The device of claim 3 wherein an arc resistant contact button is disposed on each upper portion of said plate and said element, and said electrical contact is established between said contact buttons.

5. The device of claim 3 wherein said contact plate comprises a low resistance metal, thereby functioning as a heat sink.

6. The device of claim 3 wherein said contact plate comprises a high resistance metal, thereby functioning as a heater.

7. The device of claim 4 further comprising a third lead-in wire in parallel with said first lead-in wire, said metallic element being affixed to both of said lead-in wires.

8. The device of claim 5 further comprising a fourth lead-in wire in parallel with said second lead-in wire, said contact plate being affixed to both of said lead-in wires.

9. A circuit breaker comprising:
   a hermetically sealed glass envelope;
   first and second lead-in wires disposed in said envelope and extending externally of said envelope through the lower end thereof;
   a thermostatic snap-acting metallic element for making and breaking electrical contact between said first and second lead-in wires disposed within said envelope, the lower end of said metallic element being affixed to said first lead-in wire at a point intermediate the upper end thereof and said lower end of said envelope; and
   the upper portion of said first lead-in wire being spaced from the free end of said metallic element to limit the amount of travel of said free end of said element, whereby arcing upon the breaking of electrical contact between said first and second lead-in wires is reduced and the life of the circuit breaker prolonged.

References Cited

UNITED STATES PATENTS

| | | | |
|---|---|---|---|
| 2,647,189 | 7/1953 | DePuy | 337—365 |
| 2,828,386 | 3/1958 | Malone | 337—89 |
| 2,994,754 | 8/1961 | Webking | 337—107 |
| 3,278,705 | 10/1966 | Dennis | 337—380 |

FOREIGN PATENTS

| | | | |
|---|---|---|---|
| 1,088,588 | 9/1960 | Germany | 337—372 |

BERNARD A. GILHEANY, Primary Examiner

D. M. MORGAN, Assistant Examiner

U.S. Cl. X.R.

337—110, 112